(12) United States Patent (10) Patent No.: US 9,160,747 B2
Hotti (45) Date of Patent: Oct. 13, 2015

(54) METHOD FOR DATA ACCESS CONTROL OF THIRD PARTIES IN A MULTITENANT SYSTEM

(71) Applicant: Basware Corporation, Espoo (FI)

(72) Inventor: Timo Hotti, Lohja (FI)

(73) Assignee: BASWARE CORPORATION, Espoo (FI)

( * ) Notice: Subject to any disclaimer, the term of this patent is extended or adjusted under 35 U.S.C. 154(b) by 67 days.

(21) Appl. No.: 13/926,095

(22) Filed: Jun. 25, 2013

(65) Prior Publication Data

US 2014/0013398 A1 Jan. 9, 2014

(30) Foreign Application Priority Data

Jul. 4, 2012 (FI) ...................................... 20120225

(51) Int. Cl.
*H04L 29/06* (2006.01)
*G06F 21/62* (2013.01)

(52) U.S. Cl.
CPC ............ *H04L 63/10* (2013.01); *G06F 21/6218* (2013.01); *H04L 63/08* (2013.01)

(58) Field of Classification Search
CPC . H04L 63/08; H04L 63/0869; H04L 63/0823; H04L 63/10; G06F 21/6218
USPC ........................................................... 726/4
See application file for complete search history.

(56) References Cited

U.S. PATENT DOCUMENTS

| | | | |
|---|---|---|---|
| 8,353,027 B2* | 1/2013 | Dennis et al. ................... | 726/18 |
| 2006/0021009 A1 | 1/2006 | Lunt | |
| 2007/0136603 A1* | 6/2007 | Kuecuekyan ................. | 713/185 |
| 2008/0127310 A1* | 5/2008 | Robbins et al. ................... | 726/4 |
| 2011/0106926 A1* | 5/2011 | McClain et al. ............... | 709/223 |
| 2011/0302133 A1* | 12/2011 | Kuruganti et al. ............. | 707/608 |
| 2013/0173720 A1* | 7/2013 | Vasudev et al. ............... | 709/206 |
| 2014/0013398 A1* | 1/2014 | Hotti ................................ | 726/4 |

(Continued)

FOREIGN PATENT DOCUMENTS

EP 2 116 954 A1 11/2009

OTHER PUBLICATIONS

Finnish Office Action and Search Report issued in corresponding Finnish application No. FI20120225, date of mailing Mar. 8, 2013.

(Continued)

*Primary Examiner* — Chau Le
(74) *Attorney, Agent, or Firm* — Patent Portfolio Builders PLLC

(57) ABSTRACT

The invention discloses, inter alia, a computer executable method for controlling user's access to transaction data in the context of a service in a multitenant data management system comprising data of a first organization, a second organization providing at least one service, at least one user representing the second organization, and a transaction associable by its content with the first organization. The method comprises steps for receiving a request for a user representing the second organization to access the transaction associable with the first organization in the context of a service, verifying the secondary stakeholder status of the second organization regarding the transaction, verifying the validity of a chain of trust between the user of the request and the second organization in the context, and conditional to the validity of the secondary stakeholder status and the chain of trust, authorizing the user representing the second organization to access the transaction in the context of the service.

10 Claims, 14 Drawing Sheets

(56) References Cited

U.S. PATENT DOCUMENTS

Figure 1:
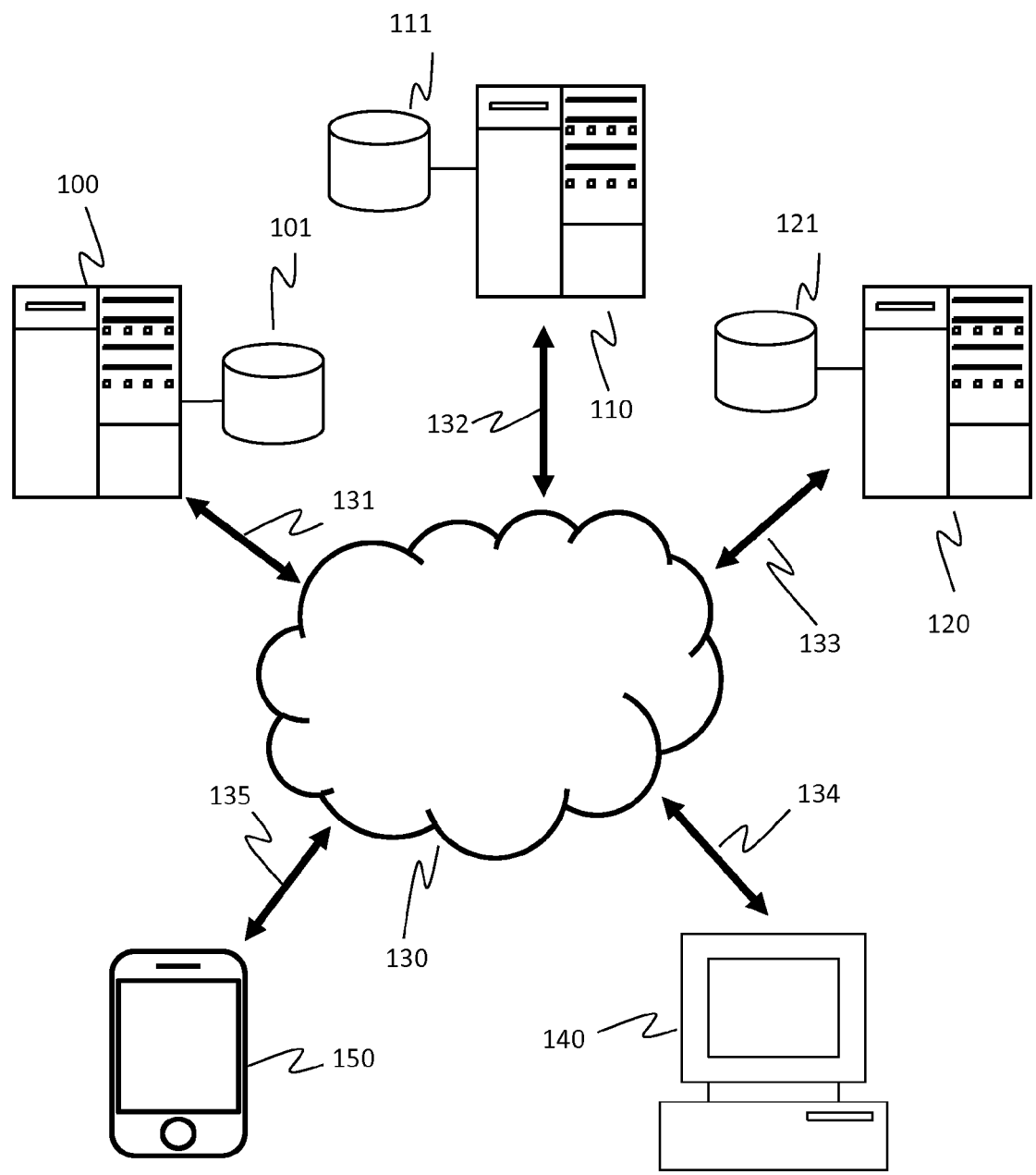

2014/0013409 A1* 1/2014 Halageri ............... 726/8
2014/0068732 A1* 3/2014 Hinton et al. ............ 726/6

OTHER PUBLICATIONS

Fong, P.W.L., "Relationship-Based Access Control: Protection Model and Policy Language," CODASPY '11, Feb. 21-23, 2011, San Antonio, Texas, USA, entire document.

Nasirifard, Peyman et al., "Annotation-Based Access Control for Collaborative Information Spaces," Computers in Human Behavior, Jul. 2011, vol. 27, pp. 1352-1364, ISSN: 0747-5632.

Jiao, Yi et al., "Cloud and SNS Supported Collaboration in AEC Industry," Proceedings of the 2012 IEEE 16th International Conference on Computer Supported Cooperative Work in Design, pp. 842-849, Wuhan, China, May 23-25, 2012, ISBN 978-1-4673-1211-0.

* cited by examiner

METHOD FOR DATA ACCESS CONTROL OF THIRD PARTIES IN A MULTITENANT SYSTEM

BACKGROUND

This invention is related to business application services that utilize the concepts of social networking such as establishing connections between people of a network. The business services may be any business application services, including but not being limited to electronic commerce systems, e.g. electronic invoicing, purchase ordering and contract lifecycle management. Yet further, the invention is applicable to multitenant systems dealing with business transactions where each transaction has a plurality of stakeholding parties, e.g. a sender and a receiver. Still yet further, the invention may be applicable to service execution platforms acting as an execution environment for a plurality of services for the transactions.

Today, social networks have grown to a popular class of web services. In such systems, access to data is controlled by the owner of the data, i.e. an individual user. Another class of web services gaining popularity today are multitenant data management systems dealing with business data, i.e. data owned by organizations instead of individuals. In such systems, access rights are typically managed by an administrative function using e.g. a suitable role-based access control solution.

A need is arising to utilize ideas familiar from social networks in business services that deal with data owned by business organizations. The prior art methods of controlling services' access to data are not suitable in such systems. On one hand, the known access control methods of social networks are not applicable as they require an individual user to own the data. On the other hand, the traditional access control methods of business application services are not practical as they require extensive amount of administrative work, e.g. in the form of frequent management of organizational structures and users' positions and roles in organizations.

There thus exist various problems in controlling business application service providers' access to data owned by business organizations in a multitenant service execution and/or data management platform. Especially there is a need to ensure that access of a third party, e.g. a service provider, to data owned by a business organization is managed in a simple and reliable manner. Also, improvements in the area of reducing the administrative burden of business systems would be greatly appreciated.

It is an object of the present invention to provide a third party access authorization method and arrangement for a service platform that uses a multitenant data management system. It is desirable that at least some of the above mentioned issues left open in the prior art solutions are addressed by some preferred embodiments of the invention.

BRIEF DESCRIPTION OF THE INVENTION

The first aspect of the present invention is a computer executable method for controlling user's access to transaction data in the context of a service in a multitenant data management system comprising data of a first organization, a second organization providing at least one service, at least one user representing the second organization, and a transaction associable by its content with the first organization. The method may be characterized in that the comprises steps for receiving a request for a user representing the second organization to access the transaction associable with the first organization in the context of a service, verifying the secondary stakeholder status of the second organization regarding the transaction, verifying the validity of a chain of trust between the user of the request and the second organization in the context, and conditional to the validity of the secondary stakeholder status and the chain of trust, authorizing the user representing the second organization to access the transaction in the context of the service.

The step of verifying the secondary stakeholder status of the second organization may comprise verifying trust between at least one user representing the first organization and at least one user representing the second organization in the context of the request.

The chain of trust verified may need to be valid for the specified context. The context data may be maintained by the data management system for a plurality of services arranged to access the data of the data management system. The context may be associated with at least one service that is executable upon the granted access permission.

The specified context may limit the second user's access to the data of the document.

The method may further comprise the step of creating a log entry comprising information about at least one user whose trust was involved in the verified chain of trust. The method may also comprise the step of granting rights to the log entry to the at least one user, whose trust was involved in the verified chain of trust.

The second aspect of the invention is a computer executable method for managing access control data for the purpose of authorizing a second user representing a second organization to access transaction data of a first organization represented by a first user wherein the first organization is, according to the content of the transaction, a primary stakeholder to the transaction. The method may be characterized e.g. in that it comprises a step for establishing, in the memory of the computer, a trust relationship between the first user and the second user, the trust relationship comprising or being associable with at least one of the following: context for the trust, and data selection criteria for selecting transaction data to be made available to the second organization. The method may also comprise a step for establishing, based on the validity of the established trust relationship between the first user and the second user, the trust relationship between the second user and the second organization and the trust relationship between the first organization and the first user at least one of the following: a conditional stakeholder association between the transaction and the second organization in the usage context, and a conditional access permission association between the transaction and at least one user representing the second organization.

The third aspect of the present invention is a computer executable method for provisioning a service in a multitenant system comprising a plurality of primary stakeholder organizations, a plurality of service provider organizations providing services, a plurality of documents and a plurality of services. The method is characterized e.g. in that it comprises steps for establishing, in the computer memory, a trust relationship between a user representing the primary stakeholder organization and a user representing the service provider organization, associating, e.g. by the multitenant platform, with the context of the trust relationship at least one service to be provided by the service provider organization, associating with the trust relationship at least one user representing the service provider organization wherein the user's identity is to be used when executing the service on the documents of the primary stakeholder organization, and associating with the trust relationship at least one rule usable for granting the service provider organization the status of a secondary stakeholder to at least some data of at least one document in at least one context. Another aspect of the present invention is an arrangement comprising at least one server computer. The arrangement is adapted to comprise means for performing the steps of at least one of the methods disclosed herein.

Yet another aspect of the present invention is a computer program product stored in a tangible computer readable storage medium. The product is adapted to comprise computer executable instructions for the purpose of performing at least one combination of steps of at least one of the methods disclosed herein.

DRAWINGS

Figure 3A:
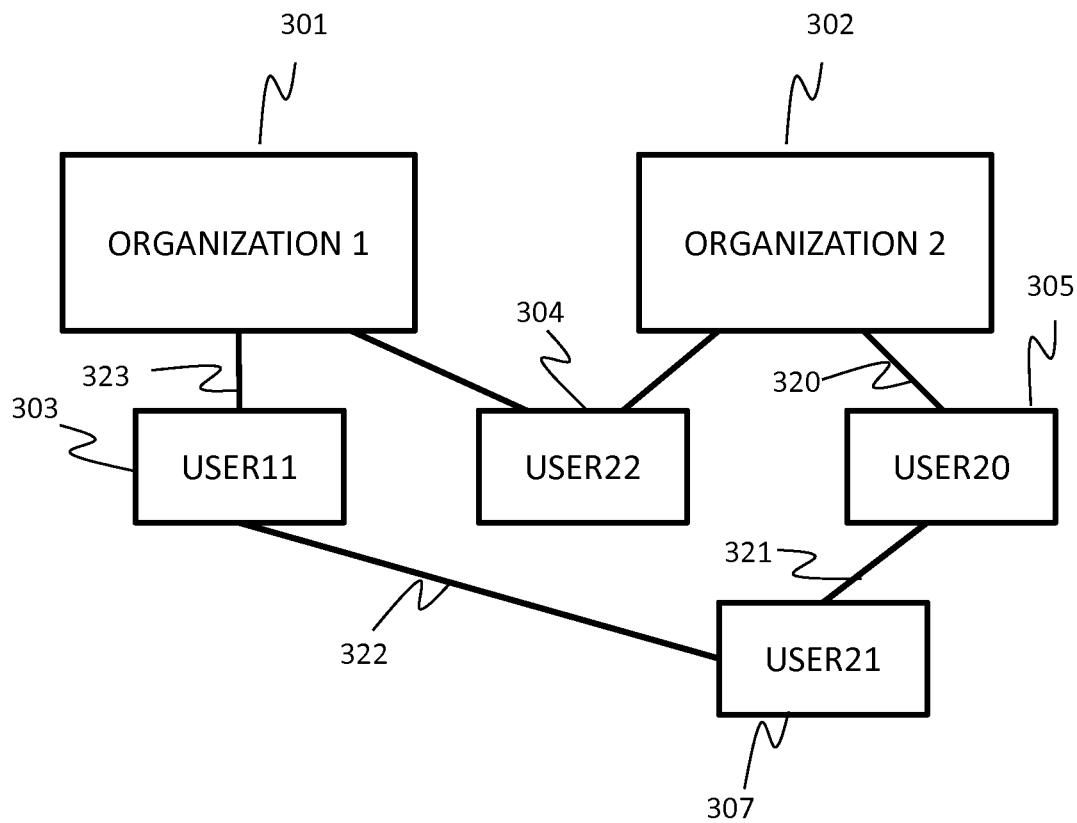
Figure 3B:
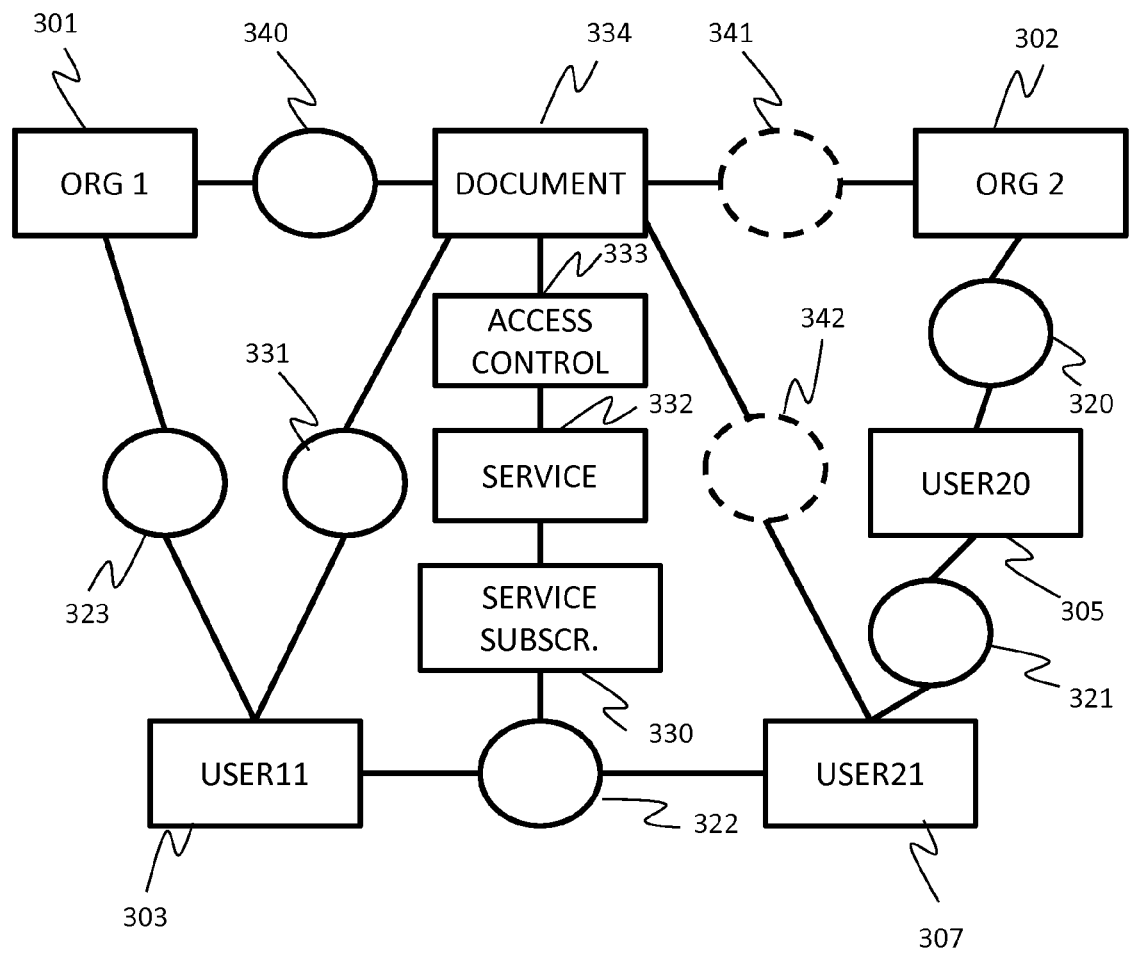
Figure 3C:
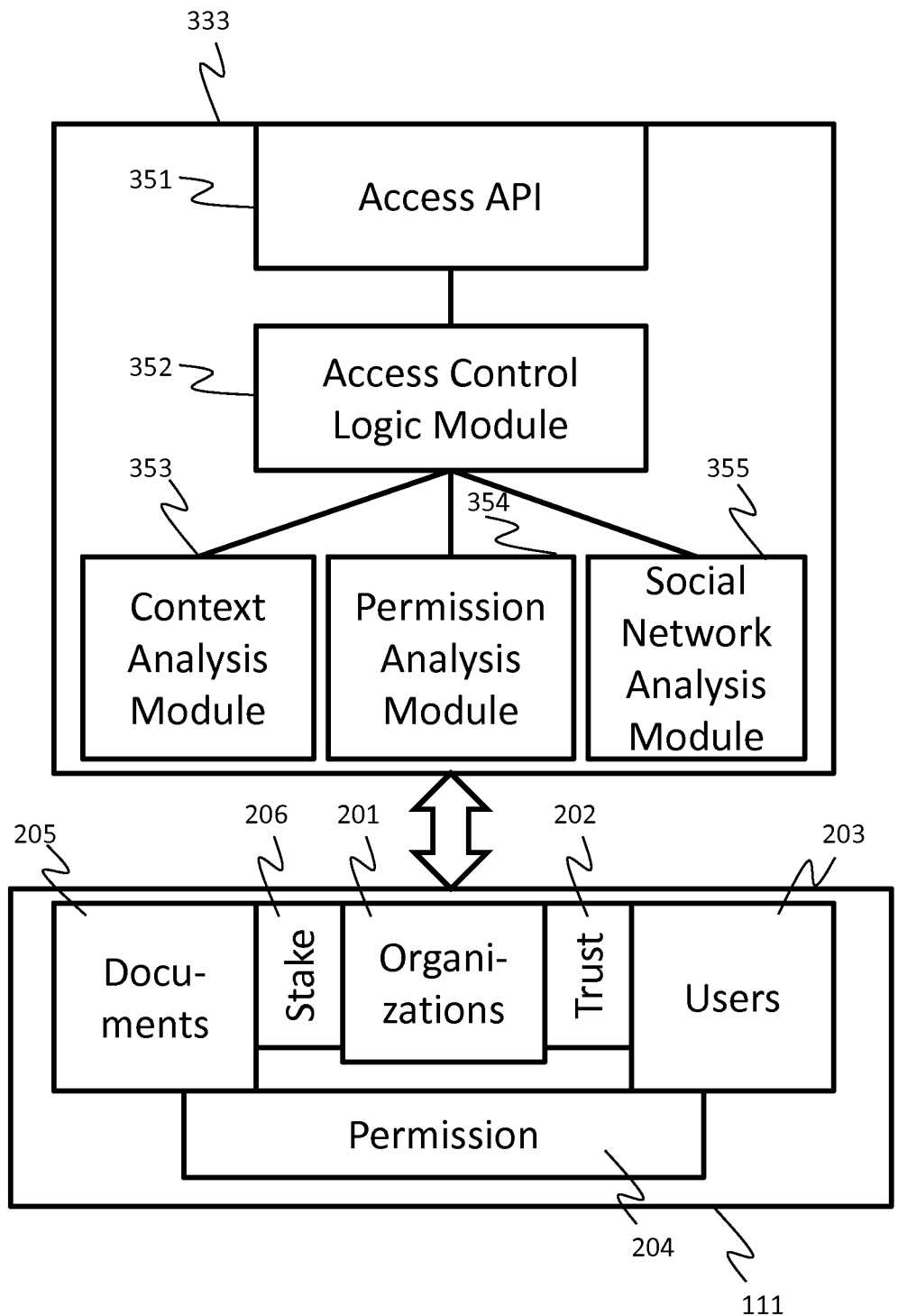
Figure 3D:
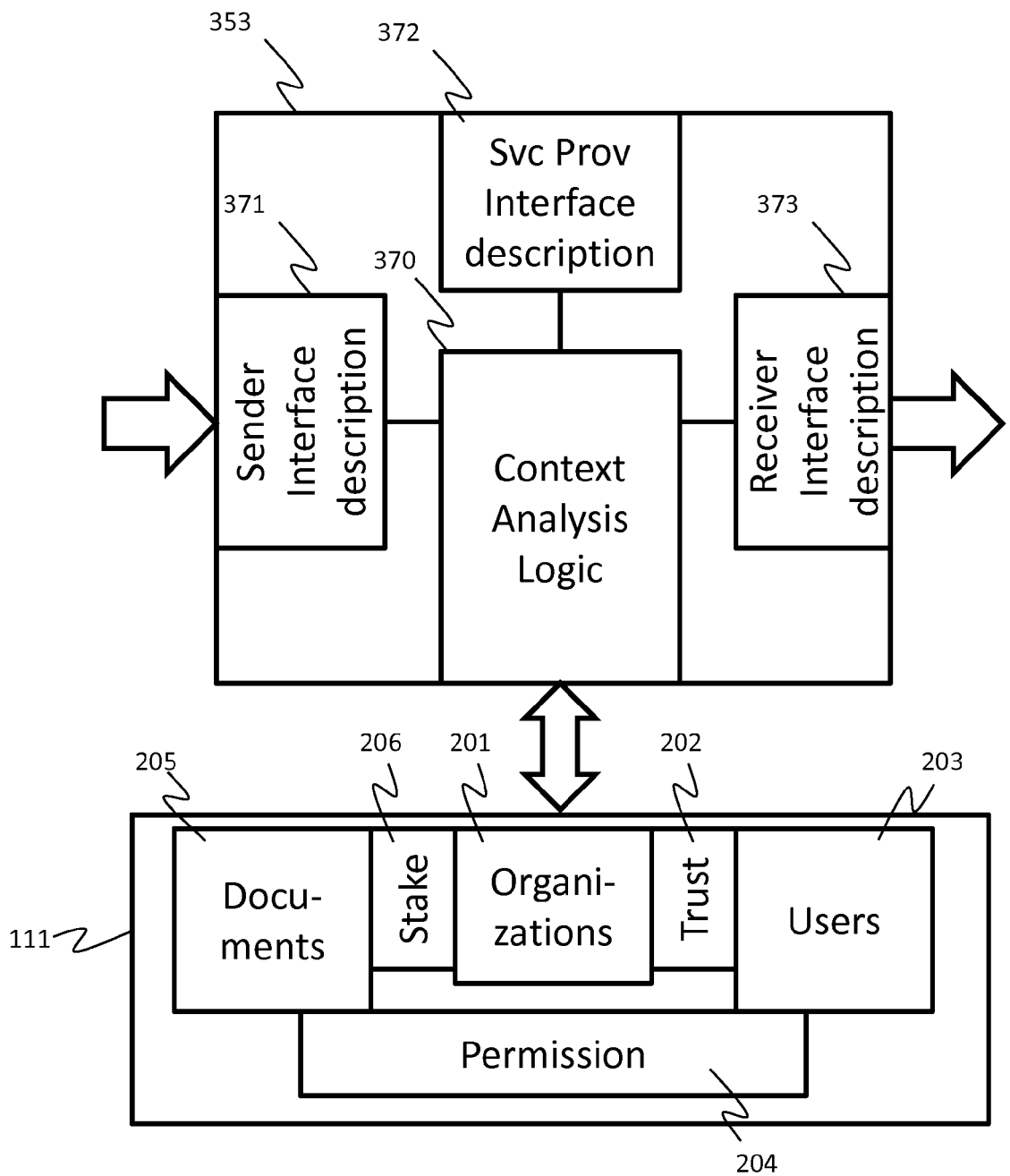
Figure 4A:
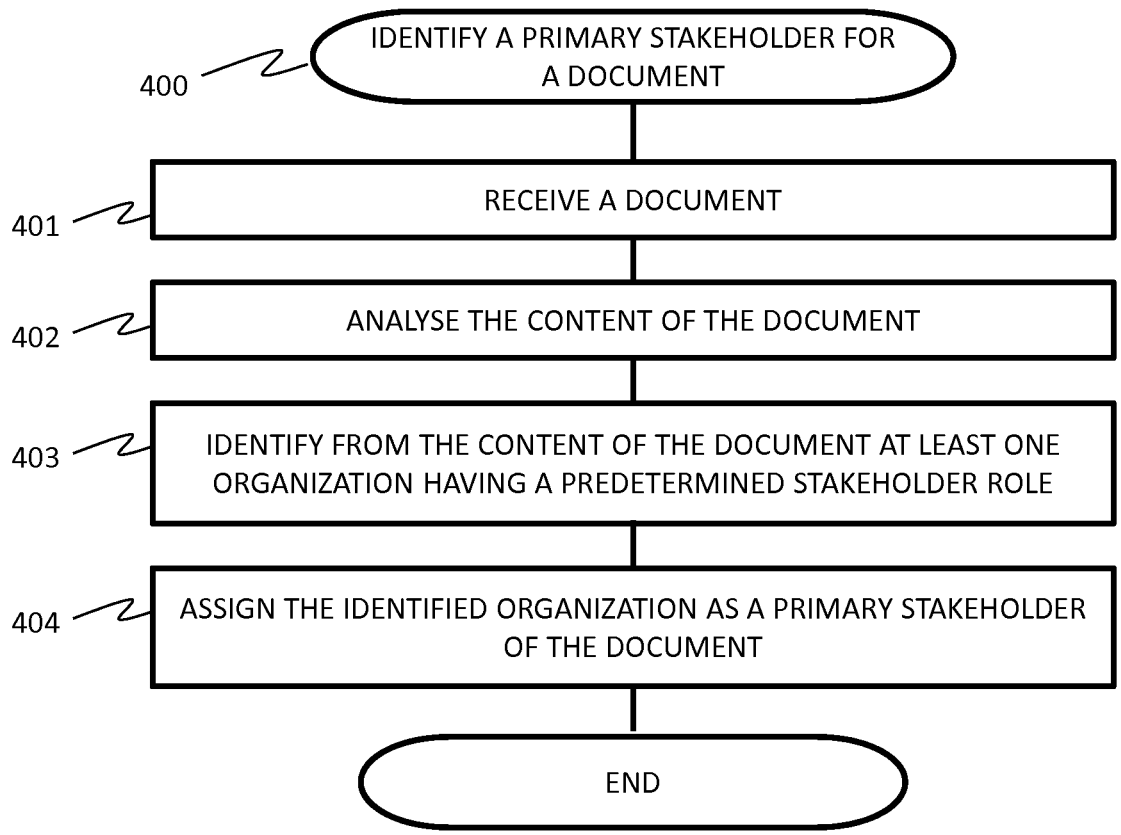
Figure 4B:
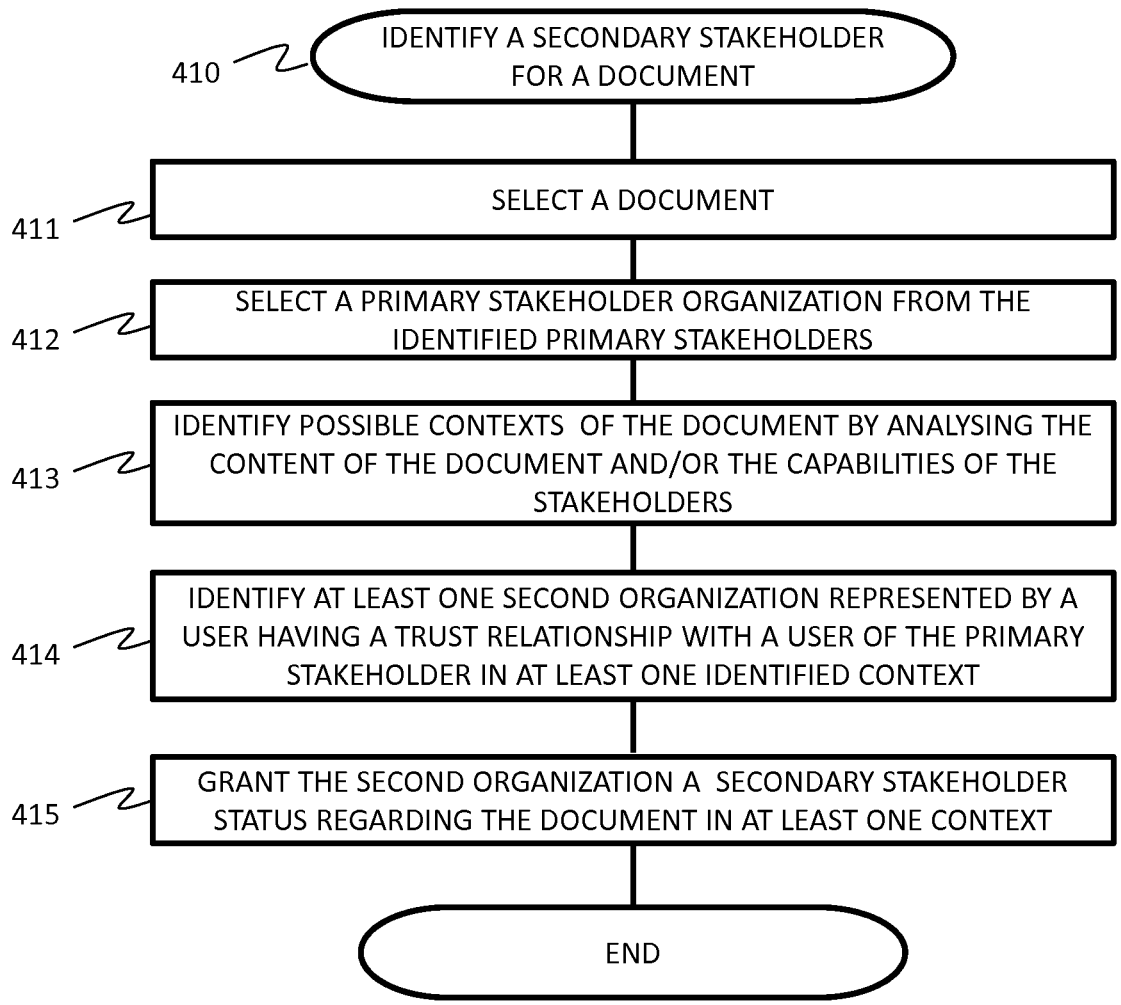
Figure 4C:
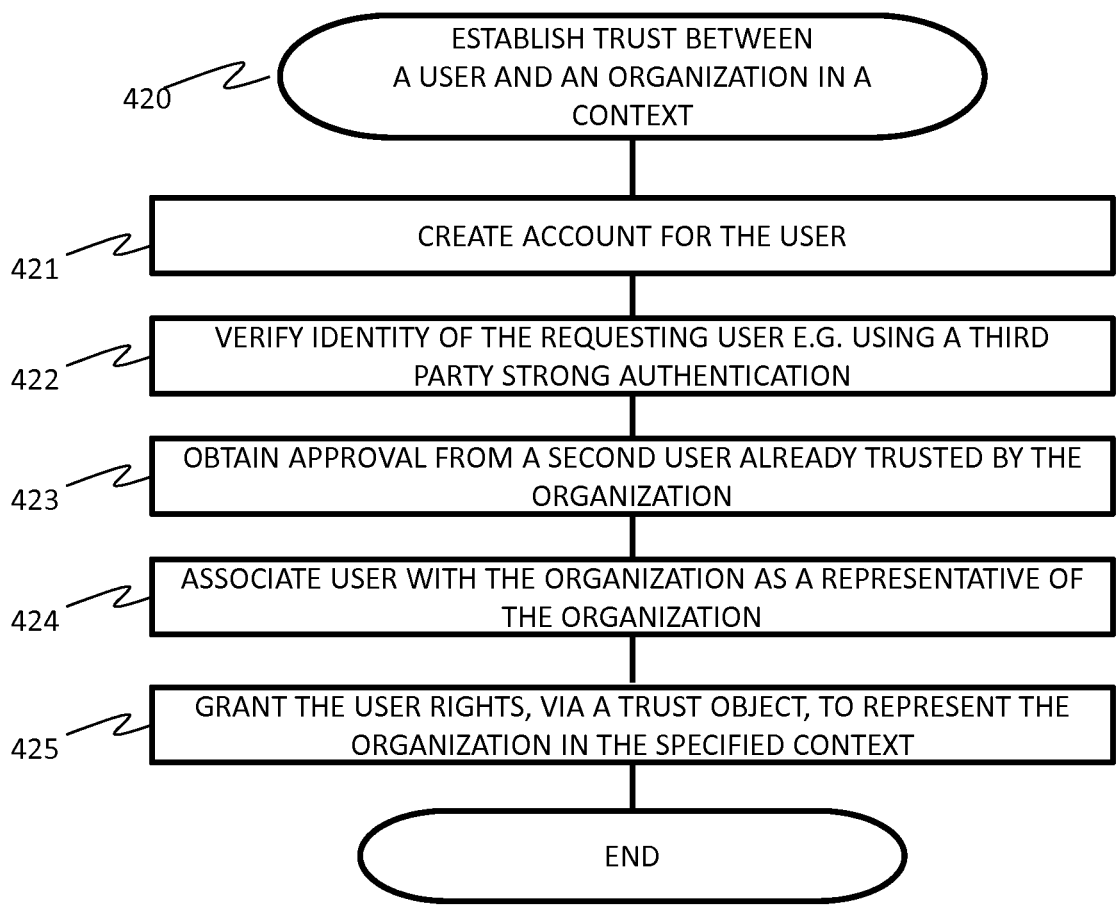
Figure 4D:
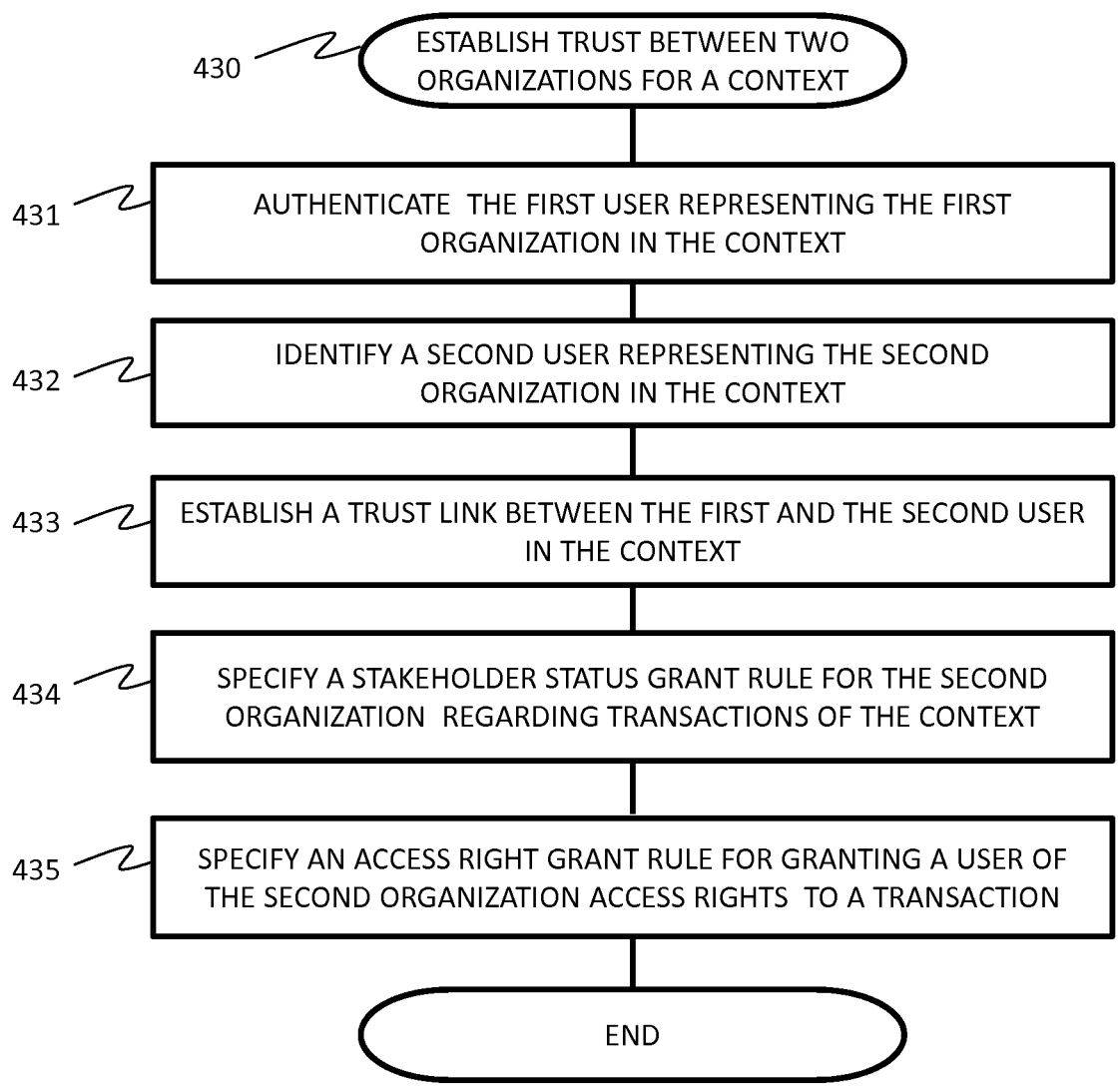
Figure 5:
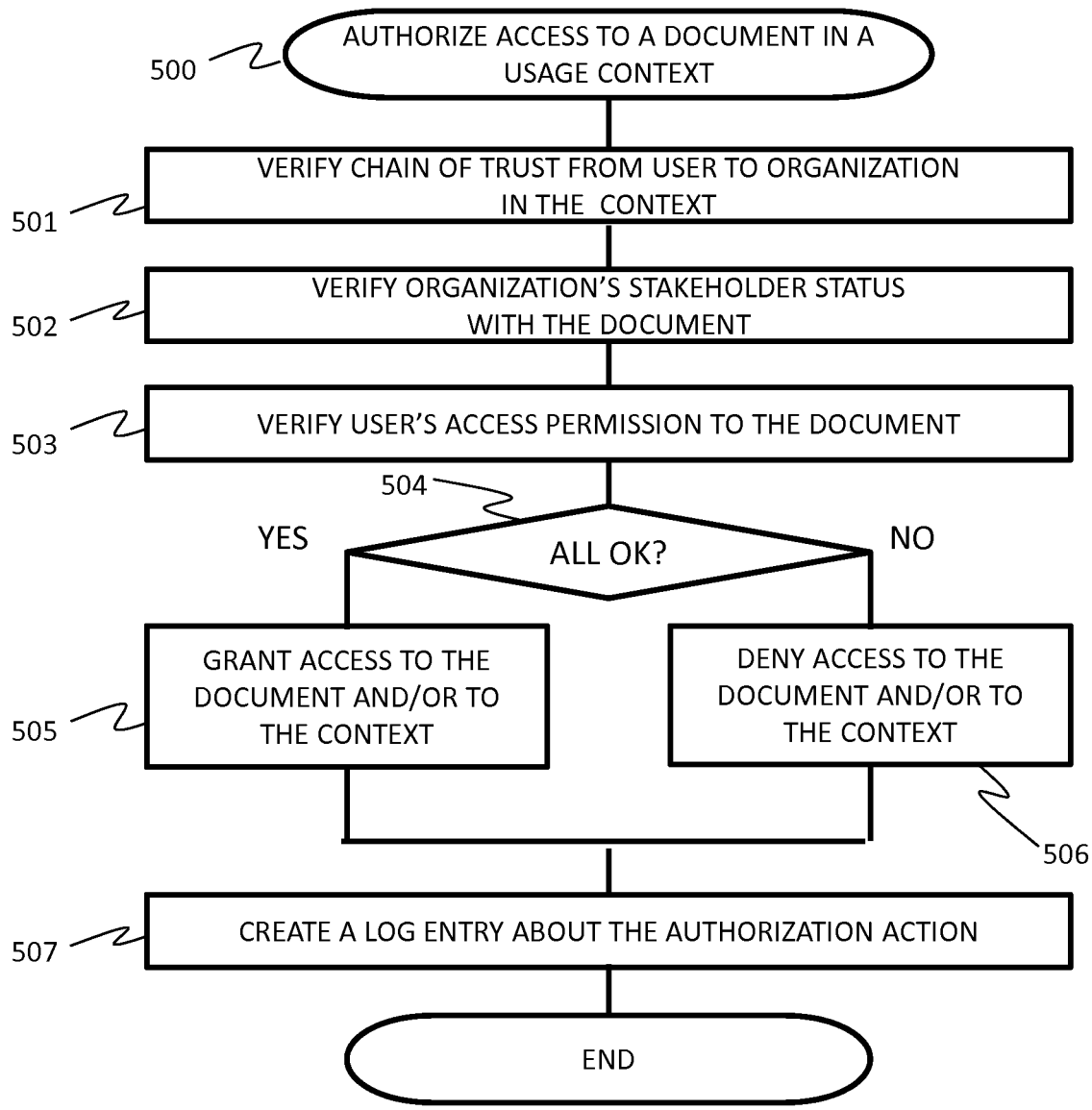
Figure 6:
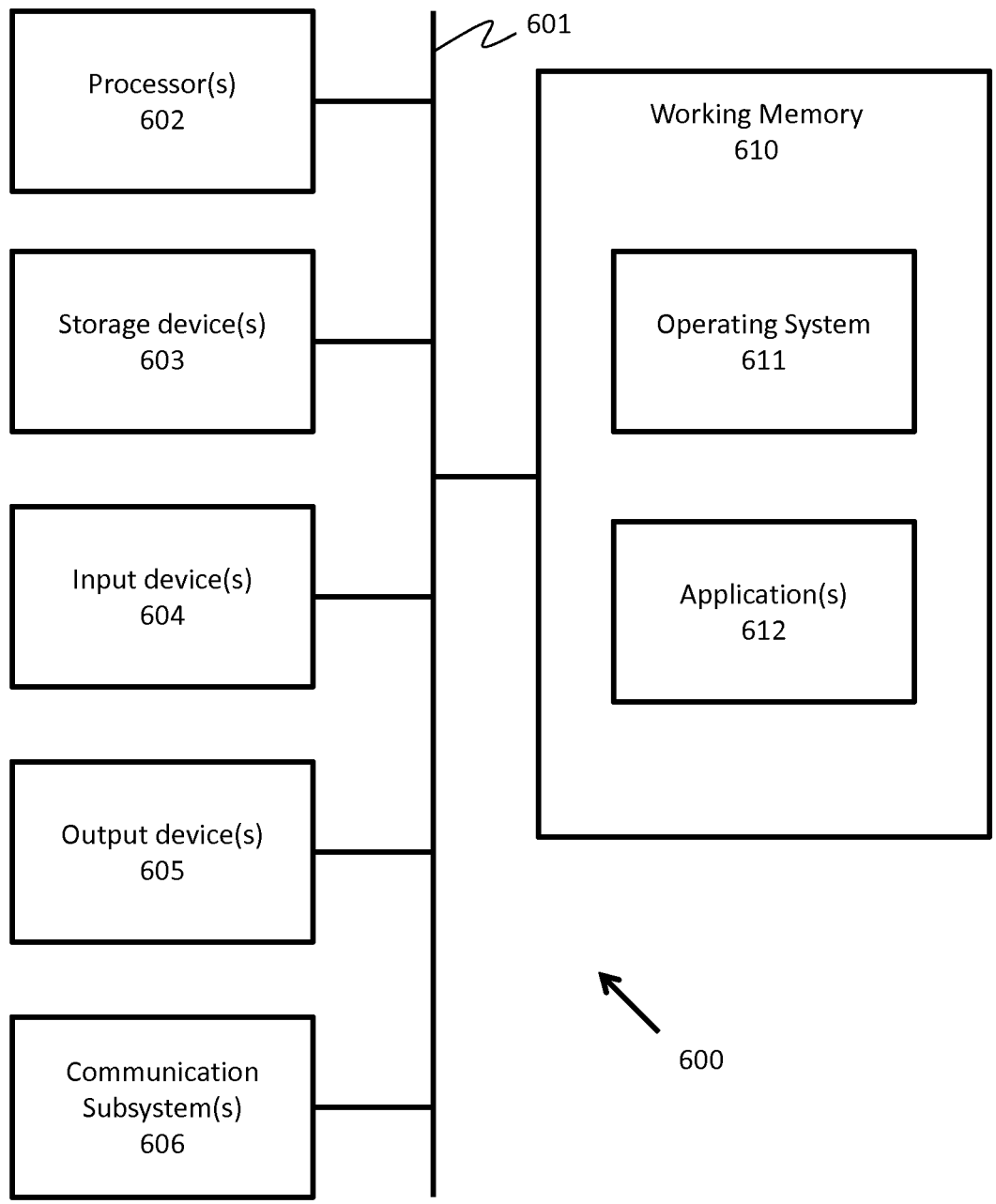

Some preferred embodiments of the invention are described below with references to accompanied figures, where:

FIG. 1 depicts an exemplary arrangement of servers and terminals according to an embodiment of the present invention, FIGS. 2a-d depict data objects (entities), their relationships and maintenance methods according to some embodiments of the present invention, FIGS. 3a-d depict further some data entities and functional components of some preferred embodiments, FIGS. 4a-d depict flow charts of data management methods according to some preferred embodiments, FIG. 5 depicts a flow chart of an access control method according to a preferred embodiment, and FIG. 6 illustrates components of an exemplary computer usable for executing various embodiments of the present invention.

DETAILED DESCRIPTION OF PREFERRED EMBODIMENTS

FIG. 1 depicts a computer and data communication arrangement according to a preferred embodiment of the present invention.

The server computer 100 comprising a data storage 101 is a source or destination of business transactions, e.g. documents, e.g. invoices, purchase requests, purchase orders or contracts. The computer 100 sends/receives copies of documents, e.g. invoices, purchase orders or contracts, to/from another server computer 110 of the system via a data exchange interface 131, 132 and network 130. A copy of the sent/received documents may reside also in the data storage 101 of the server 100. There may be any number of server computers 100 in the system.

The server computer 110 is the master data management server of the documents and other data of the system. In a preferred embodiment, there may be any number of server computers which together provide the master data management server functionality. The master data is stored in the storage 111 of the server. Advantageously, the storage 111 comprises business documents which each are associable with multiple stakeholder organizations, e.g. buyer and seller of an invoice, and which are accessible by a plurality of users. The organization data and user data are part of the master data and are thus also stored in the storage 111 of the server 110. In addition to managing the master data of the system, the server computer 110 acts as a platform for running a plurality of services related to the master data of the storage 111. The users may access the master data via a plurality of terminal computers 140, 150 and data communication connections 134, 135 through the application services hosted e.g. by the server computer 110. In an embodiment, the server 110 acts as the manager of the master data and as the provider of master data access control services. The master data may in this embodiment be accessed from other computers through an interface publishing the master data access control services.

The server computer 120 depicts an application server which provides additional services related to the documents, organizations and users managed by the master data management system 110. A copy of at least some of the data of the system may be stored in the storage 121 of the server. There thus may be one copy of a document in the storage 121 and another copy in the storage 111. In an embodiment, the back-end application server may provide e.g. invoice automation services, e.g. invoice routing services, invoice life cycle management services or factoring services. There may be any number of servers 120 in the system. For example, there may be separate servers for each service provider. There may also be multiple service providers utilizing the same server. The servers may also be virtual servers. In a preferred embodiment, the server 120 has a data exchange interface with the server 110 for the purpose of exchanging document and document-related data, e.g. document status update events, between the servers 110 and 120.

Figure 2A:
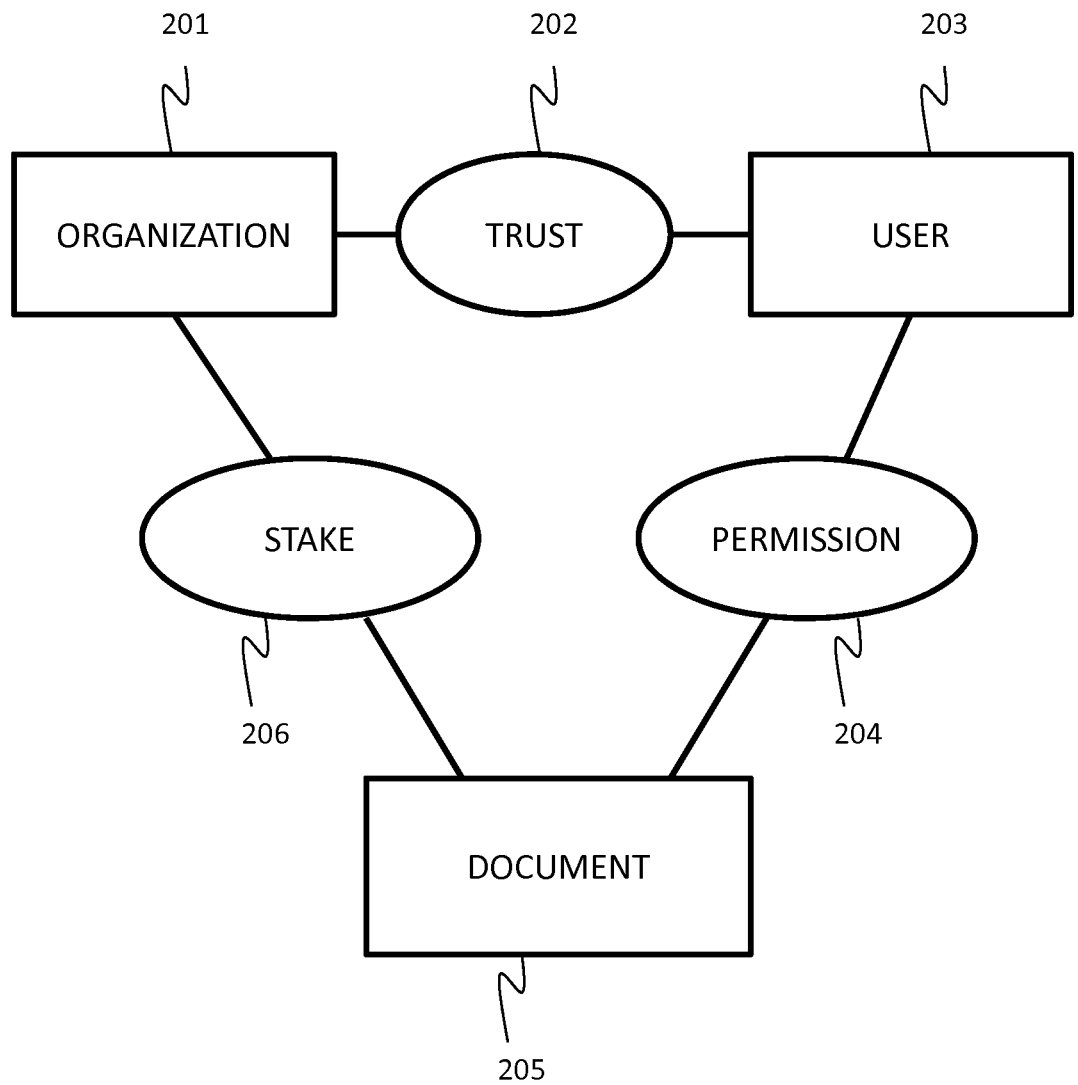

FIG. 2a depicts an exemplary overview of the master data managed by the data management component of the server (110 and 111 in FIG. 1) of an embodiment of the present invention. The master data comprises three main entities (objects): organization data 201, user data 203 and document data 205. Each organization may act as a stakeholder 206 of a business document 205. For example, an organization 201 may be a seller or a buyer of an invoice. An organization may be represented by at least one, preferably by a plurality of users 203 through a trust relationship 202. The trust relationship 202 may specify a context, e.g. a service or a plurality of services, in which the user 203 may represent the organization 201. The representation may occur e.g. via a service that is associated with the context. For example, an organization may trust a user to represent it in all invoicing related contexts or in a specific invoicing related context, e.g. collaboration processes between organizations that aim towards a dispute resolution. The available contexts may be defined and maintained in the access control services of the master data management platform running on computer 110. A context may be associated, e.g. by the operator of the access control services, with any number of services and a service may be associated with multiple different contexts. For example, there may be multiple different services for the context of dispute resolution of invoices. The services may be provided by different service providers.

In the embodiment shown, the user 203 is further linked to at least one document 205 via an access permission link (relationship) 204. The permission 204 may specify which kind of access the user has to the document. The access permission may be e.g. for a read access or for a read/write access. The permission may also contain information about the basis of the permission. One basis for a user to have access to a document may for example be that the same user has access rights to the document or has accessed the document in another system (e.g. 100 or 120 in FIG. 1). Another basis for a user to have access to a document may be that another user, with whom the user has a trust relationship in a context, is allowed to access or has accessed the document in the context of the trust. A permission object 204 may thus be created between a user and a document when another user has accessed or has permission to access the document utilizing trust of the user. Yet another basis for user to have access permission to a document may be e.g. a rule that has been defined in the established trust relationship. For example, the rule may specify that the user, to whom the trust has been granted, has access permission to the same documents to which the grantor of the trust has access permission.

The data objects mentioned herein may be implemented in the memory of a computer e.g. as data objects or in any other manner accessible and modifiable by a processor of the computer. The functional components of various embodiments described herein, including steps of various methods, may be implemented as instructions executable by the processor of the computer.

In a preferred embodiment, the data model of FIG. 2a is used for user 203 access authorization purposes in a multi-tenant system comprising a plurality of organizations 201 and a plurality of documents 205, each document having at least one, preferably multiple, organizations 201 as stakeholders. If a user 203 wants to represent an organization in a process involving a document, the user 203 needs to have established a trust link (relationship) 202 with the organization 201 either directly or via another user 203 who already has established a trust relationship 202 with the organization for the context of the process. Additionally, the user needs to have a permission link 204 to the document 205 and the organization 201 must be a stakeholder 206 of the document 205.

Figure 2B:
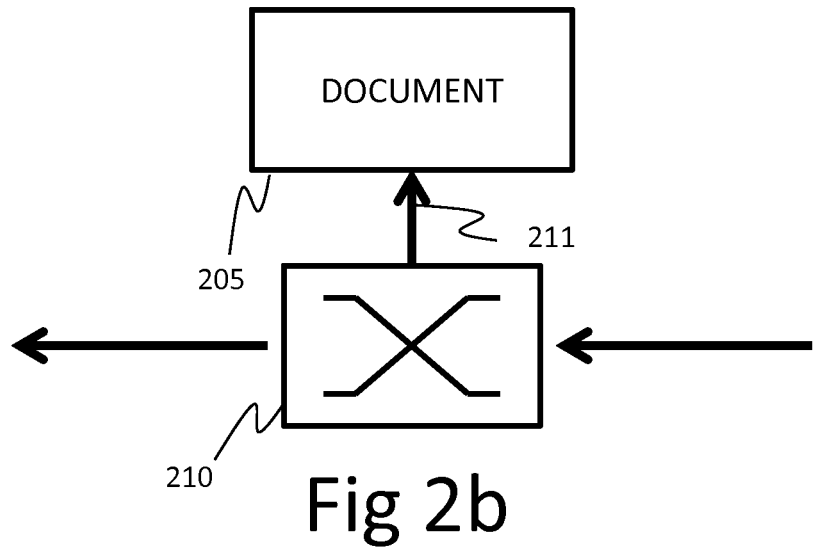

FIG. 2b depicts an exemplary arrangement for importing document data into document collection 205 of the storage 111 of server 110 e.g. via a data exchange interface 211. The arrangement comprises a source of documents 210, for example a document router or an application service adapted to send or receive a document. Copies of the documents are transmitted from the source of documents to the collection of documents 205 using the data exchange interface 211. The document source may also transmit supplementary data associable with the business documents. Such data may comprise e.g. access control information, event information or state change information related to the business document.

Figure 2C:
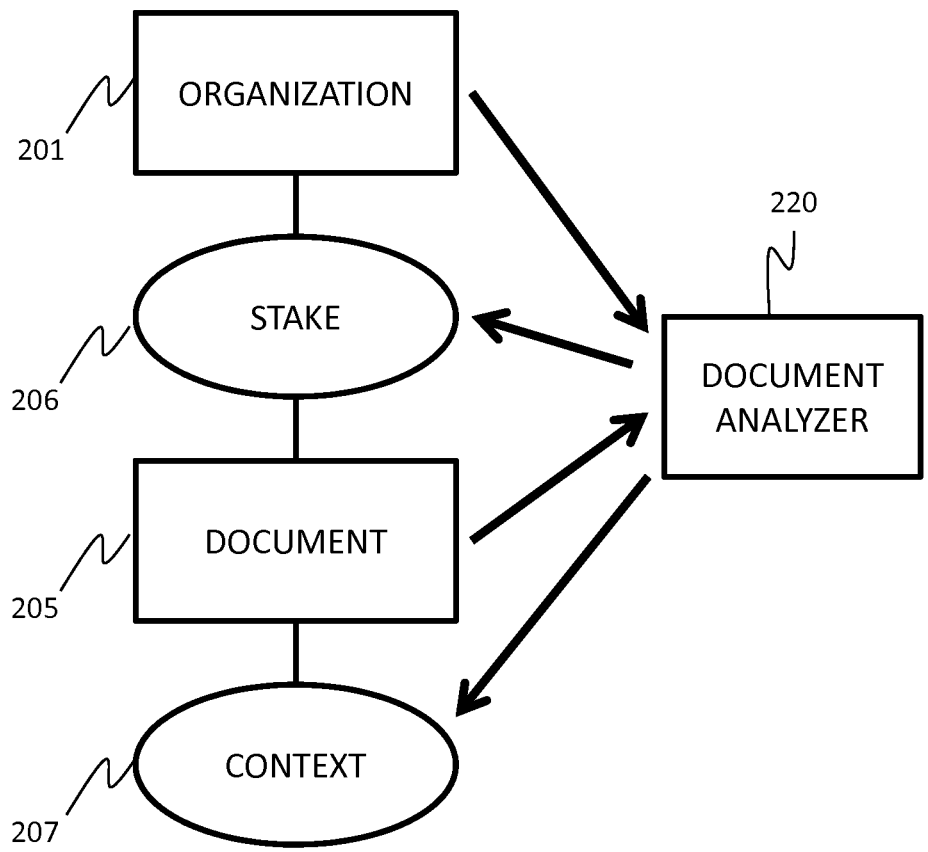

The documents imported to the collection of documents 205 are analyzed using for example an arrangement shown in FIG. 2c. The analysis is needed to establish the stakeholder relationships 206 between organizations 201 and imported documents 205. The analysis is performed using a document analyzer component 220. The analyzer inspects the data of the imported document and determines based on its findings, which organizations are stakeholders of the document. The inspected data may comprise the content of the document and/or meta-data, including routing data usable by the router 210, related to the document. The content of the document may contain e.g. the name and address information of the sender (seller) and recipient (buyer) of an invoice. In an embodiment, a specific combination of information may identify two stakeholders. E.g. the seller name specifies the seller but the associated address or other contact information specifies the financing company who performs the invoicing on behalf of the seller. In such case, both the seller and the financing company should be added as stakeholders of the document. The meta-data of the document may comprise e.g. routing information of the document in a document routing network or some data related to an activity performed on the document.

In a preferred embodiment, the stake object between a document and an organization is established only, if there is at least one additional data item available that confirms the business relationship between the organizations identifiable in the document. For example, sending an invoice document from an organization to another organization may not be a sufficient act alone to make the receiving organization a stakeholder of the document and thus establish a business relationship between the organizations.

The receiving organization may become a stakeholder, if the document analyzer 220 e.g. identifies a purchase order document that is associable with the invoice or if the document analyzer 220 identifies an event received from an external system, e.g. an invoice processing system, that indicates that the invoice has been accepted by the receiving organization as a valid invoice.

In addition to establishing the stakeholder relationships 206 between organizations 201 and documents 205, the document analysis process of an embodiment performed e.g. by the document analyzer component 220 determines the possible usage contexts 207 of the document 205. The usage context may e.g. indicate, which (kind of) services may be provided for the document. The process of determining the possible usage contexts may utilize e.g. the content of the document 205 or any properties of the stakeholder organizations 201 as input. For example, a usage context may require a certain property from the document, a certain capability from the application services of the sender and/or a certain capability from application services of the receiver. To exemplify further, in order to be able to provide a factoring service to an invoice, the invoice must contain a discount percentage for quick payment of the invoice and the receiver of the invoice must be able to receive the invoice from a party other than the original sender. The "factoring" context can thus be associated with an invoice only, if it contains the discount percentage and the receiver meets the interface criteria set for factoring services.

Figure 2D:
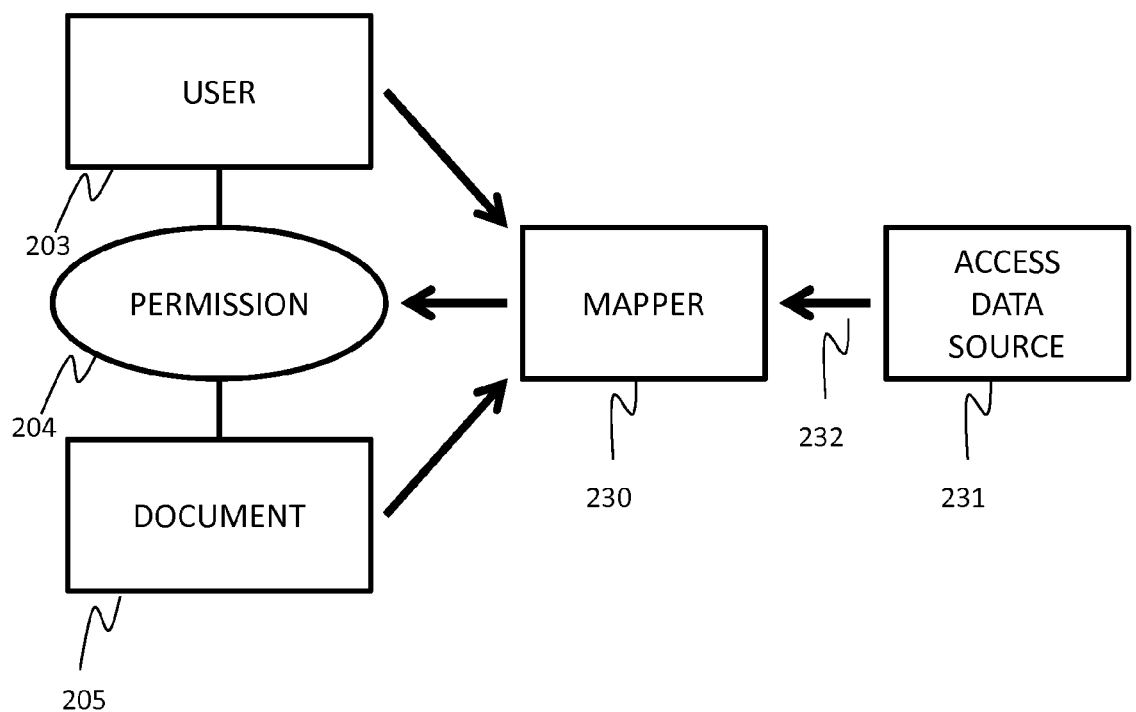

According to a preferred embodiment, in order for a user 203 to access a document 205, a permission link 204 must have been established between the user and the document. In some embodiments, some other applicable condition may be checked when determining access right to the document. FIG. 2d shows an exemplary arrangement for establishing the permissions. The arrangement comprises a mapper component, which receives information usable for establishing the permission from an access data source 231. The access data source may be e.g. an application server (120 and 121 in FIG. 1) which has a copy of the document 205 and which is capable of providing an application service regarding the document. The access data source 231 sends access data regarding users and documents to the mapper 230 via a data exchange interface 232. The access data may comprise e.g. access control list of a document or access history data (i.e. access log data) of the document. Typically an access data item comprises identifiers for a user and a document. The data that comes from the access data source 231 (120 in FIG. 1a) is specific to the application service and needs to be mapped to the data of the master data management system 110. For example, the user IDs ("local user IDs") of the obtained access data are typically specific to the access data source. Therefore, the "local user ID" must be mapped with the corresponding user ID ("global user ID") of the user 203 of the master data management system. Similarly, the document identifier of the back-end system (120 in FIG. 1a) may be different than what is used for the document 205 in the master data management system. The identifiers of the local systems must be mapped with the identifiers of the master data management system by the mapper component 230 before the permission object 204 between the user 203 and document 205 is established. The mapping information is advantageously managed by the master data management system 110.

FIG. 3a shows an exemplary diagram of trust relationships on one hand between organizations and users and on the other hand trust relationships between users representing same or different organizations. In the figure, each line (e.g. 320) represents a trust relationship between an organization (e.g. 302) and a user (e.g. 305) or between users 321. A trust relationship allows the grantee user to represent the grantor in a context specified in the trust relationship. For example, the trust relationship 320 may authorize "USER20" 305 to represent the "ORGANIZATION 2" in a certain context, e.g in any activity regarding invoices of the organization. The USER20 305 may delegate at least part of this trust relationship further to another user, e.g. "USER21" 307 by establishing a new trust relationship 321. Now "USER21" is able to represent "ORGANIZATION 2" in the same context as USER20 305.

A user who has a trust relationship 323 with a first organization 301 may establish a trust relationship 322 with the user 307 who has a trust relationship (in the shown embodiment indirectly through trust links 321, 321) with the second organization 302. The established trust relationship 322 contains information about the context in which the user 303 trusts the user 307. The trust relationship 322 also contains information about organizations (301, 302) that the users represent while establishing the relationship. In a preferred embodiment, the trust relationship 322, that has been established between representatives 303, 307 of two different organizations 301, 302, represents an agreement to share at least some data of at least some documents of organization 301 with organization 302, preferably in the context of at least one service provided e.g. by the organization 302. The agreement information may be used e.g. when determining secondary stakeholders to a document. For example, the "ORG 2" 302 may be selected as a secondary stakeholder to a document which already has "ORG 1" 301 as a primary stakeholder, if the USER11 303 has established a trust relationship 322 with USER21 307 and the document in question belongs or is applicable to the context specified in the trust relationship 322.

It is also noteworthy, that a single user, such as "USER22" 304, may be trusted directly by multiple organizations 301, 302. For example, the "USER22" 304 may have a role in invoicing services, e.g. invoice data validation services, in both organizations 301, 302. For this reason, both organizations have granted the user rights to represent the respective organizations in the context of invoice management services.

FIG. 3b depicts some data and functional elements usable by a method of controlling access to a document according to a preferred embodiment of the present invention. In the shown example, user "USER11" 303 represents the organization "ORG 1" 301 via a trust relationship 323 in a context. For example, the trust relationship may allow the user to represent an organization in invoice-related contexts. Organization 301 is a primary stakeholder of document 334 as represented by the stake object 340 which may have been created e.g. using method described in FIG. 2c. The user 303 has access rights to the document 334 as represented by the permission object 331 which may have been created e.g. using method shown in FIG. 2d. In an embodiment, the permission object may also be created using a rule associated e.g. with the trust relationship 323. In such rule, organization 301 may instruct the master data management system to create for the user 303 permission objects 331 to all documents 334 that meet some specified data selection criteria. For example, a superuser of an organization, e.g. a user who is trusted by the organization in all contexts relevant to the organization, in the master data management system may have access to all documents of the organization.

In the example shown, there is also another organization "ORG 2" 302 who is represented in the master data management system by "USER20" 305 via a trust relationship object 320 that allows user 305 to represent the organization 302 in a context. Advantageously, the context is associated with at least one service provided by the organization. In a preferred embodiment, the organization 302 is an application service provider who provides services related to documents 334, e.g. invoices, to a plurality of organizations 301. The user 305 has delegated some of the trust he/she has received from the organization 302 for a context further to user "USER21" 307 by means of a trust object 321.

To continue the example further, the user 303 representing the organization 301 in a context, e.g. invoicing, wants to establish a service subscription 330, on behalf of the organization 301, to an application service 332 that belongs to the desired context. The service is provided by the organization 302. In order for the organization 302 to access the document data 334 required by the service 332, a trust relationship 322 must be established between the user 303 and user 307 for the desired service context, e.g. invoice automation services. While the trust relationship 322 is valid, the organization 302 may be regarded as a secondary stakeholder 341 of documents 334 where the organization 301 is a primary stakeholder, e.g. a sender or receiver of an invoice. In other words, the organization 302 may be a secondary stakeholder of a document 334 in a context as long there exists a valid trust relationship 322 for the context between the users 303 and 307 wherein the user 303 represents a primary stakeholder. The trust (agreement) relationship 322 may comprise or be associated with data selection criteria which define, for which subset of the transactions of the primary stakeholder 301 the organization 302 may be considered as a secondary stakeholder. Further, the user 307 may use the conditional access permission 342 to access the document 334. The conditional access permission 342 may be e.g. a copy of the user's 303 permission 331 or a pointer to the permission 331 which is valid, if the trust (agreement) relationship 322 is valid. Now that the access permission 342 exists for the user 307 and stake 341 exists for the organization 302, the access control module 333 may grant the service 332 provided by the organization 302 and used by the user 307 access rights to the document 334. Should the trust relationship 322 become invalid, e.g. via revocation by user 303 or 307 or via expiration, the access of service 332 to the document 334 is denied by the access control module.

In an embodiment, the conditional stake object 341 and/or the conditional permission object 342 may comprise, or have access to, instructions for adapting the content of the document 334 that is shown to the user 307 representing the organization 302. For example, some data content of the document may be hidden from the user 307 or delivered to the user in an obfuscated form when accessed in the context. The data adaptation instructions may be associated e.g. with the trust relationship 322 established between the organizations 301 and 302.

FIG. 3c depicts an exemplary simplified diagram of an access control module 333 of an embodiment of the present invention. Like any other functional module of the present invention, the module may be implemented as a computer program code comprising processor executable instructions and utilizing persistent and/or volatile computer memory. The module comprises an Access API (Application Programming Interface) 351 that publishes services needed e.g. for requesting access to a document. A typical access request comprises information about the user requesting the access and about the context (service) for which the access is requested. The interface utilizes for implementation of the services the functionality of the Access Control Logic Module 352. In a preferred embodiment, the access control logic module further utilizes functionality provided by the Context Analysis Module 353, Permission Analysis Module 354 and Social Network Analysis Module 354. All modules utilize the data 201-206 of the storage 111.

The Context Analysis Module analyzes the content and/or properties of the documents 205 and their relationships with e.g. organizations for the purpose of identifying, whether a certain context (e.g. a group/category of services) is possible for the document 205. For example, the module 353 may analyze, if the context of electronic invoice routing services is possible for an invoice that has been received into the database of storage 111. For such context, the received document must be (or must be translatable) into a format of an electronic invoice and the recipient organization (stakeholder) of the document must be able to receive and process such invoices.

The Permission Analysis Module 354 comprises functionality for determining, if a user 203 is allowed to access a document 205 in general. In a preferred embodiment, the user 203 must have both a general permission 204 to access a document and also a permission to represent the organization in the context (granted in a trust relationship 202) where the document 205 is to be used.

The Social Network Analysis Module 355 analyses trust relationships 202 between users 203 and organizations 201. The module 355 is thus able to determine e.g. if a user 203 is permitted to represent an organization 201 in a specified context.

FIG. 3d depicts in more detail the Context Analysis Module 353. The module comprises Context Analysis Logic 370 that is in a preferred embodiment implemented using computer executable instructions. The logic 370 has access to the data of the database of storage 111 of which it uses especially the document 205, organization 201 and stake 206 data. Additionally, the logic has access to a plurality of interface descriptions, which describe the capabilities of the stakeholders of documents. In the embodiment shown, there is a description of sender interface 371, service provider interface 372 and receiver interface 373.

To further elaborate the process of analyzing existence of a context for a document, an example about invoice factoring context is provided herein. To determine, if a document 205 may be used in the context of invoice factoring service, a number of conditions may need to be met. First, the document 205 must be an invoice that has a discount percentage for immediate payment. Second, there must be a secondary stakeholder relationship 206 (341 in FIG. 3b) between an organization 201 providing the factoring service and the invoice document 205. The data, e.g. the discount percentage, required by the factoring service is described e.g. in the service provider interface description 372. Third, the receiver organization 201 (stakeholder) of the invoice must be able to receive factored invoices. This ability is described in the receiver interface description 373. In a further example, the receiver is able to receive better service (e.g. in form of a better discount) from the factoring service provider, if the receiver of the invoice is able to send document status update information to the document collection of the database of storage 111. For example, a quick approval and/or payment of an invoice may be rewarded by the factoring service provider in the form of a discount.

FIG. 4a shows a flow diagram about identifying 400 a primary stakeholder (301 in FIG. 3b) of a document. In step 401, a document is received into the database residing in the storage 111 of the master data management system 110. The document may have any suitable format comprising structured and/or unstructured data. The structured data may be e.g. XML data and the unstructured data may be e.g. document image data. In step 402, the content of the document is analyzed. If the content is in an unstructured format, the content is converted into a structured format so that individual data items (fields) of the document may be assigned a semantic meaning. Next, in step 403, at least one organization (201 in FIG. 2a) is identified from the content of the document to have a pre-determined primary stakeholder role in the document. Such pre-determined role may be e.g. a sender or a receiver of an invoice. In an embodiment, the primary stakeholder identification process must identify at least two primary stakeholders for the document. Failure to do so marks the document as an erroneous document that requires e.g. manual resolution. The identified organizations must be available in the organization data collection of the database of the data storage 111. Finally, in step 403, the identified organizations are assigned as primary stakeholders of the document.

In a preferred embodiment, the document may also have at least one secondary stakeholder. In such embodiment, an organization is a secondary stakeholder to a document, preferably in a context of at least one service, if a trust relationship exists between a user representing the primary stakeholder of the document and a user representing the second organization. The flow chart of FIG. 4b depicts an exemplary method 410 of identifying such stakeholders utilizing the social network of an embodiment of the present invention. In step 411, a document is selected for the process. The document may be e.g. a document that was received in the process described in FIG. 4a. Next, in step 412, a previously identified primary stakeholder is selected from the list of primary stakeholders of the document. Next, in step 413, possible contexts (e.g. services or classes of services available to the document) of the document are identified. In a preferred embodiment, the identification process inspects the content of the document and/or the capabilities of the already known stakeholders of the document. For example, a document may belong to an electronic invoice routing context, if the document can be interpreted as an electronic invoice, i.e. it is already one or it can be translated into one, and the receiver of the document, i.e. a primary stakeholder, is capable of receiving electronic invoices. In step 414, at least one second organization is identified, whose representative user, i.e. user who is allowed to represent the organization, has a trust relationship (322 in FIG. 3b) with the representative user of the primary stakeholder in at least one identified context. If the trust relationship comprises or is associated with data selection criteria, the method checks that the document meets those criteria. Those documents that fail to meet the criteria are ignored. Finally, in step 415, the second organization is granted a secondary stakeholder status to the document in the context specified in the trust relationship. For example, an organization providing invoice routing services may be granted a secondary stakeholder status to the document in the context of routing of electronic invoices. In a preferred embodiment, the secondary stakeholder status is valid as long as the chain of trust between the primary and secondary stakeholder organizations involving the trust relationship (322 in FIG. 3b) is a valid one.

FIG. 4c depicts an exemplary method of establishing a trust relationship (202 in FIG. 2a) between a user (203 in FIG. 2a) and organization (201 in FIG. 2a). The trust relationship is needed for the purpose of authorizing the user to represent the organization in a context comprising at least one service. If the user does not have an account in the database of the storage 111 of the master data management system 110, the account needs to be created 421. Initially, the account is not associated with any organization. The true identity of each user needs to be reliably verified 422 before the user may be associated with any organization. The verification may utilize e.g. a generally trusted strong authentication service of e.g. a bank or the identity may be verified by at least one user whose identity has been strongly authenticated in the master database management system. Next, in step 423, an approval for the user to represent the organization is obtained from a second user who is already trusted by the organization. If the user is the first user to represent the organization, the approval may be obtained from the administrator of the master data management system. Now in step 424, the user may be associated with the organization as the representative of the organization e.g. by establishing a trust relationship object between the user and the approving user. If the approving user is the administrator of the master data management system, then the trust relationship object may be established between the organization and the approved user. Finally, in step 425, the user is granted rights to represent the organization in at least one context. For example, the user may be allowed to represent the organization in all invoicing related contexts. The representation rights may not exceed the representation rights of the user who approved the user as the representative of the organization.

According to a preferred embodiment, trust relationships may also be established between organizations by establishing a trust relationship (e.g. 322 in FIG. 3*b*) between users representing their respective organizations. Such trust relationships may be regarded as agreements between organizations. In a preferred embodiment, such agreement authorizes an organization to act, in a context specified in the agreement, as a secondary stakeholder for documents meeting selection criteria specified in the agreement. FIG. 4*d* depicts a simplified example of a method for establishing 430 trust between two organizations for a context. First, in step 431, a first user representing, via a trust relationship, an organization, e.g. a primary stakeholder of a plurality of documents in the master data management system, is authenticated in the system. Next, a second user, who represents the second organization in the system, is selected 432. In a preferred embodiment, both the first and the second user must have representation rights to represent their respective organizations in the context in which the trust having the data sharing agreement between the organizations is to be established. Those representation rights are specified in the trust relationship objects between the users and their respective organizations. Now a trust link (322 in FIG. 3*b*) may be established 433 between the first and the second user. In this case, the trust link specifies an agreement that allows the second organization to act, in the context specified in the agreement, as a secondary stakeholder to documents that meet criteria specified in the agreement. The trust link of agreement type thus comprises information about at least one context, in which the users and their respective organizations trust each other. Furthermore, the trust link of agreement type also comprises information about data selection criteria that specify the document data that is made available to the second organization. Such data selection criteria may form e.g. at least one stakeholder status grant rule 434 which thus specifies conditions under which the second organization may be granted the status of secondary stakeholder (341 in FIG. 3*b*) regarding a document. The trust link may also be amended 435 with rules that specify, how a user, e.g. the second user, representing the second organization, is authorized (342 in FIG. 3*b*) to access a document (334 in FIG. 3*b*) while the trust link is a valid one.

FIG. 5 depicts an exemplary method of authorizing a user (e.g. 307 in FIG. 3*b*) to access a document (334 in FIG. 3*b*) in a context specified e.g. in a trust link (322 in FIG. 3*b*). Firstly, the access authorization requires, that the user is trusted by his/her organization in the context specified in the authorization request. This is checked in step 501 where the validity of the chain of trust (321, 320 in FIG. 3*b*) between the user 307 and the organization (302 in FIG. 3*b*) is verified. In a preferred embodiment, also the chain of trust from trust link 322 to organization 301 via user 303 and trust link 323 is verified to ensure the validity of the trust link 322. Secondly, the organization must be a stakeholder of the document. The stakeholder may be a primary or secondary stakeholder. This is checked in step 502, where the existence and validity of a stake object (341 in FIG. 3*b*) is queried. It should be noted, that in the case of a secondary stakeholder, the validity of the stake object 341 is conditional to the existence and validity of the trust link 322. If there is no valid trust between the (users of the) organization 301 and organization 302, the organization 302 cannot be a secondary stakeholder to the document 334. Thirdly, a permission object is needed between the user 307 and the document 334. This is checked in step 503. In case of a user representing a secondary stakeholder, the validity of the permission object 342 is conditional to the validity to the existence and validity of e.g. the trust link 322 or the stake object 341. If all three checks are successful 504, access is granted to the document 505. Otherwise, access is denied 506.

In a preferred embodiment, the step of granting 505 or denying 506 access to the document or the step of actual use of the granted access is followed by a step of creating and persisting in the memory of a computer a log entry 507 about the authorization action. The log entry may comprise any information used in the process of determining the access rights, including information about users whose trust was part of the chains of trust between user 307 and secondary stakeholder organization 302 and/or between user 303 and primary stakeholder organization 301 verified e.g. in step 501. At least one of the users may be other than the user to whom access was granted. In an embodiment, information about any or all of the trust objects of the entire chain of trust from organization 301 to organization 302 may be included in the log entry. Those users may be granted access to the created log entry e.g. for the purpose of enabling them to monitor the use of their trust and to take action, if necessary. Allowing an individual user to monitor the use of his/her trust in the system may reduce even significantly, if not almost entirely, the need of separate access right administration in the system. In an embodiment, the method of the present invention comprises means for e.g. statistically analyzing the created log entries e.g. for the usage of the trust and alerting at least one user e.g. higher in the chain of trust, if e.g. the usage pattern of the trust granted by the user to other users changes in a significant manner.

FIG. 6 shows a schematic illustration of one embodiment of a computer system that can perform the methods of the described embodiment. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 601 (or may otherwise be in communication, as appropriate). The hardware elements can include one or more processors 602, communication subsystems 606, one or more input devices 604, which can include without limitation a mouse, a keyboard and/or the like; and one or more output devices 605, which can include without limitation a display device, a printer and/or the like. The computer system 600 may further include (and/or be in communication with) one or more storage devices 603. The computer system 600 also can comprise software elements, shown as being located within the working memory 610, including an operating system 611 and/or other code, such as one or more application programs 612, which may comprise computer programs of the described embodiments, and/or may be designed to implement methods of the described embodiments of a computer-method of the embodiments as described herein.

At least some embodiments include a program storage device readable by a machine, tangibly embodying a program of instructions executable by the machine to perform a computer-executable method of an embodiment of the present invention.

Although specific embodiments have been described and illustrated, the embodiments are not to be limited to the specific forms or arrangements of parts so described and illustrated.

The invention claimed is:

1. A computer executable method for controlling user access to transaction data in the context of a service in a multitenant data management system comprising data of:
   a first organization,
   a second organization providing at least one service,
   at least one user representing the second organization, and
   a transaction associable by its content with the first organization, wherein the method comprises steps:
   receiving a request from at least one user representing the second organization to access the transaction associable with the first organization in the context of a service,
   verifying a secondary stakeholder status of the second organization regarding the transaction,
   verifying the validity of a chain of trust between the at least one user representing the second organization and the second organization in the context, and
   conditional to the validity of the secondary stakeholder status and the chain of trust, authorizing the at least one user representing the second organization to access the transaction in the context of the service,
   wherein the step of verifying the secondary stakeholder status of the second organization comprises verifying a chain of trust between at least one user representing the first organization and the at least one user representing the second organization.

2. The method according to claim 1, wherein the authorization is further conditional to existence of a separate permission object that links the at least one user representing the second organization with the transaction.

3. The method according to claim 1, wherein the validity of the chain of trust is verified for the context specified in the request.

4. The method according to claim 1, wherein the context data is adapted to be maintainable by the multitenant data management system for a plurality of services.

5. The method according to claim 1, wherein the context is adapted to be associated with at least one service that is executable upon the granted access permission.

6. The method according to claim 1, wherein the specified context limits the at least one user representing the second organization's access to the data of the transaction.

7. The method according to claim 1, wherein the method further comprises the step of creating a log entry comprising information about the at least one user representing the second organization whose trust was involved in the verified chain of trust.

8. The method according to claim 7, wherein the method comprises the step of granting access rights to the log entry to the at least one user representing the second organization, whose trust was involved in the verified chain of trust.

9. A computer arrangement for controlling user access to transaction data in the context of a service in a multitenant data management system comprising data of:
   a first organization,
   a second organization providing at least one service,
   at least one user representing the second organization, and
   a transaction associable by its content with the first organization, wherein the arrangement is configured to:
   receive a request from at least one user representing the second organization to access the transaction associable with the first organization in the context of a service,
   verify a secondary stakeholder status of the second organization regarding the transaction,
   verify the validity of a chain of trust between the at least one user representing the second organization and the second organization in the context, and
   conditional to the validity of the secondary stakeholder status and the chain of trust, authorize the at least one user representing the second organization to access the transaction in the context of the service,
   wherein the arrangement of verifying the secondary stakeholder status of the second organization comprises verifying a chain of trust between at least one user representing the first organization and the at least one user representing the second organization.

10. A non-transitory computer readable medium for controlling user access to transaction data in the context of a service in a multitenant data management system comprising data of:
    a first organization,
    a second organization providing at least one service,
    at least one user representing the second organization, and
    a transaction associable by its content with the first organization, wherein the non-transitory computer readable medium comprises computer executable instructions for:
    receiving a request from at least one user representing the second organization to access the transaction associable with the first organization in the context of a service,
    verifying a secondary stakeholder status of the second organization regarding the transaction,
    verifying the validity of a chain of trust between the at least one user representing the second organization and the second organization in the context, and
    conditional to the validity of the secondary stakeholder status and the chain of trust, authorizing the at least one user representing the second organization to access the transaction in the context of the service,
    wherein the instruction of verifying the secondary stakeholder status of the second organization comprises verifying a chain of trust between at least one user representing the first organization and the at least one user representing the second organization.

\* \* \* \* \*